US012276522B2

(12) United States Patent
Furihata

(10) Patent No.: US 12,276,522 B2
(45) Date of Patent: Apr. 15, 2025

(54) INFORMATION PROCESSING APPARATUS, MOVABLE APPARATUS, INFORMATION PROCESSING METHOD, AND STORAGE MEDIUM

(71) Applicant: CANON KABUSHIKI KAISHA, Tokyo (JP)

(72) Inventor: Hisayoshi Furihata, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 93 days.

(21) Appl. No.: 18/157,969

(22) Filed: Jan. 23, 2023

(65) Prior Publication Data

US 2023/0251106 A1    Aug. 10, 2023

(30) Foreign Application Priority Data

Feb. 9, 2022    (JP) .................................. 2022-018484

(51) Int. Cl.
*G01C 21/32*    (2006.01)
*G01C 21/00*    (2006.01)
*G01C 21/28*    (2006.01)
*G06V 20/50*    (2022.01)

(52) U.S. Cl.
CPC ......... *G01C 21/3837* (2020.08); *G06V 20/50* (2022.01)

(58) Field of Classification Search
CPC ............................ G01C 21/3837; G06V 20/50
See application file for complete search history.

(56) References Cited

U.S. PATENT DOCUMENTS

| 10,189,162 B2 | 1/2019 | Tateno |
| 10,203,197 B2 | 2/2019 | Hirota |
| 11,227,434 B2 | 1/2022 | Chen et al. |
| 2019/0186923 A1* | 6/2019 | Servos ................. G05D 1/0246 |

(Continued)

FOREIGN PATENT DOCUMENTS

JP        2020-087407 A    6/2020

OTHER PUBLICATIONS

Sebastian Thrun, et al., "Integrating Grid-Based and Topological Maps for Mobile Robot Navigation," Proceedings of the Thirteenth National Conference on Artificial Intelligence (Aug. 1996).

(Continued)

*Primary Examiner* — Patrick E Demosky
(74) *Attorney, Agent, or Firm* — Venable LLP

(57) ABSTRACT

To provide an information processing apparatus capable of creating a high-quality map with reduced measurement omissions, in an information processing apparatus, sensor information that includes shape information of a surrounding environment is acquired from a three-dimensional sensor mounted on a movable apparatus, position and orientation information of the three-dimensional sensor when the three-dimensional sensor has measured the shape information is acquired, map information for the creation of a shape map of the surrounding environment is created based on the shape information and the position and orientation information, a portion corresponding to a movable object in the shape information is recognized based on the sensor information, and a measurement omission region that corresponds to a measurement omission in the shape map is set based on the sensor information, the position and orientation measurement information, and the portion.

14 Claims, 12 Drawing Sheets

(56) References Cited

U.S. PATENT DOCUMENTS

2020/0167993 A1    5/2020  Chen et al.
2020/0209881 A1*   7/2020  Huang .................... G06T 7/579

OTHER PUBLICATIONS

Jamie Shotten, et al., "Real-Time Human Pose Recognition in Parts from Single Depth Images", CVPR2011 (2011).
Richard A. Newcombe, et al., "KinectFusion: Real-Time Dense Surface Mapping and Tracking, " IEEE International Symposium Mixed and Augmented Reality (ISMAR) (2011).

* cited by examiner

//INFORMATION PROCESSING APPARATUS, MOVABLE APPARATUS, INFORMATION PROCESSING METHOD, AND STORAGE MEDIUM

BACKGROUND OF THE INVENTION

Field of the Invention

The present invention relates to an information processing apparatus, a movable apparatus, an information processing method, and a storage medium.

Description of the Related Art

There is a technology in which a three-dimensional sensor is moved and rotated to create a shape map (hereafter simply referred to as a "map") that denotes the shape of an entire surrounding environment based on shape information that was measured from a plurality of points. In general, it is desirable that this map can consist only of static objects that do not physically move.

In Japanese Patent Laid-Open No. 2020-87407, a movable object such as a person or a vehicle is recognized in a camera image, and a map that excludes a movable object can be created by removing the corresponding shape information.

Further, a method for creating a map that denotes occupied and unoccupied regions created in this manner is disclosed, for example, in Publication 1 (Sebastian Thrun, Arno Bücken "Integrating Grid-Based and Topological Maps for Mobile Robot Navigation", Proceedings of the Thirteenth National Conference on Artificial Intelligence, 1996.).

Further, a method of recognizing a human based on machine learning is described, for example, in Publication 2 (Jamie Shotten, et al, "Real-Time Human Pose Recognition in Parts from Single Depth Images", CVPR2011).

Further, a method for estimating the position and orientation of a sensor based on a distance image and a method for creating a three-dimensional map are described, for example, in Publication 3 (Richard A. Newcombe, et al, "Kinect Fusion: Real-Time Dense Surface Mapping and Tracking", EEE International Symposium Mixed and Augmented Reality (ISMAR), 2011).

However, if a movable object is reflected when the three-dimensional sensor is moved and rotated and measures the environment, not only does the movable object intrude into the map, but also the region hidden behind the object can no longer be measured, thus creating a measurement omission in the map and degrading its quality. No such problem has been recognized in the conventional technology.

SUMMARY OF THE INVENTION

One of objects of the present invention to provide an information processing apparatus capable of creating a high-quality map with reduced measurement omissions. In an information processing apparatus, one aspect of the present invention includes the following. At least one processor or circuit configured to function as a sensor information acquisition unit configured to acquire sensor information that includes shape information of a surrounding environment from a three-dimensional sensor mounted on a movable apparatus, a position and orientation information acquisition unit configured to acquire position and orientation information of the three-dimensional sensor when the three-dimensional sensor has measured the shape information, a map information creation unit configured to create a shape map of the surrounding environment based on the shape information and the position and orientation information, an object recognition unit configured to recognize a portion corresponding to a movable object in the shape information based on the sensor information, and a setting unit configured to set a measurement omission region that corresponds to a measurement omission in the shape map based on the sensor information, the position and orientation measurement information, and the portion.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using embodiments. In each diagram, the same reference signs are applied to the same members or elements, and duplicate description will be omitted or simplified.

First Embodiment

In a first embodiment, a case in which a mobile robot such as an Automated Guided Vehicle ("AGV") or Autonomous Mobile Robot ("AMR") provided with a three-dimensional sensor is used will be explained. In addition, the mobile robot of the present embodiment uses Simultaneous Localization and Mapping ("SLAM") technology, which measures the surrounding environment by moving and rotating to create a map based on shape information obtained at plurality of points.

Figure 1:
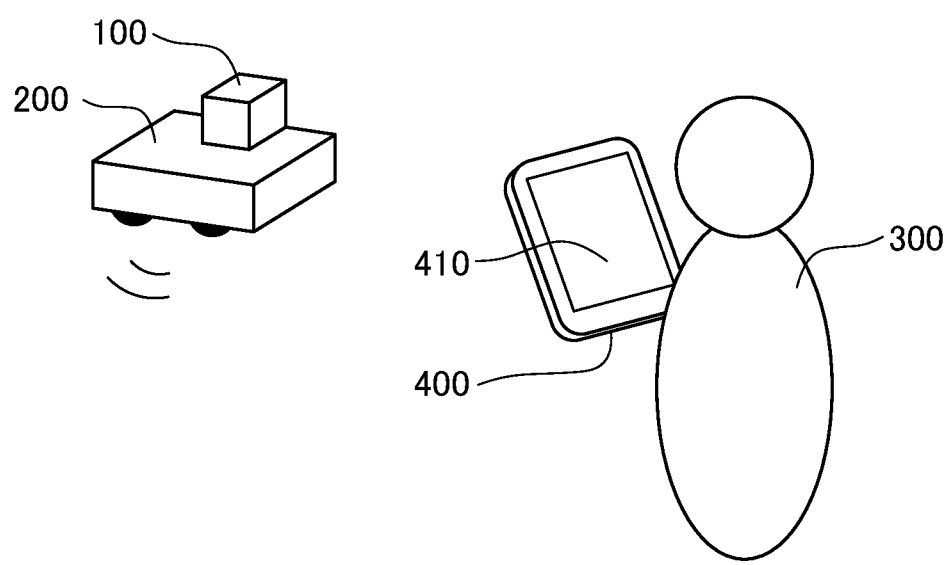
FIG. 1 is a diagram showing a scenario setting of a use case according to a first embodiment.

FIG. 1 is a diagram showing a scenario setting of a use case according to a first embodiment. In FIG. 1, a mobile robot 200 serving as a moving body (movable device, moving device, movable apparatus, moving apparatus, mobility, vehicle) is provided with a three-dimensional sensor 100, and a user 300 controls movement by using a controller 400. A display apparatus 410 displays a shape map that was created based on the shape information that was measured on the route up to the current point in time.

The user 300 refers to a map that is displayed on the display apparatus 410 and increases the number of measurement points by controlling the mobile robot 200 so that a desired map is completed. In the first embodiment, when a movable object is reflected, a portion of the shape information that was acquired by the three-dimensional sensor that corresponds to the movable object is recognized, and a region that is behind the object and cannot be measured from the three-dimensional sensor (hereinafter referred to as a "measurement omission region") is displayed on the display apparatus 410.

The user 300 confirms the information that is displayed here, and in a case in which a measurement omission region is found, performs processing such as eliminating a movable object. Thereafter, by re-measuring by moving/rotating the mobile robot 200 so that the three-dimensional sensor 100 can measure this region, a high-quality map with no measurement omission can be created.

Hereinafter, a detailed explanation of the first embodiment will be given. First, a module configuration according to the first embodiment will be explained.

Figure 2:
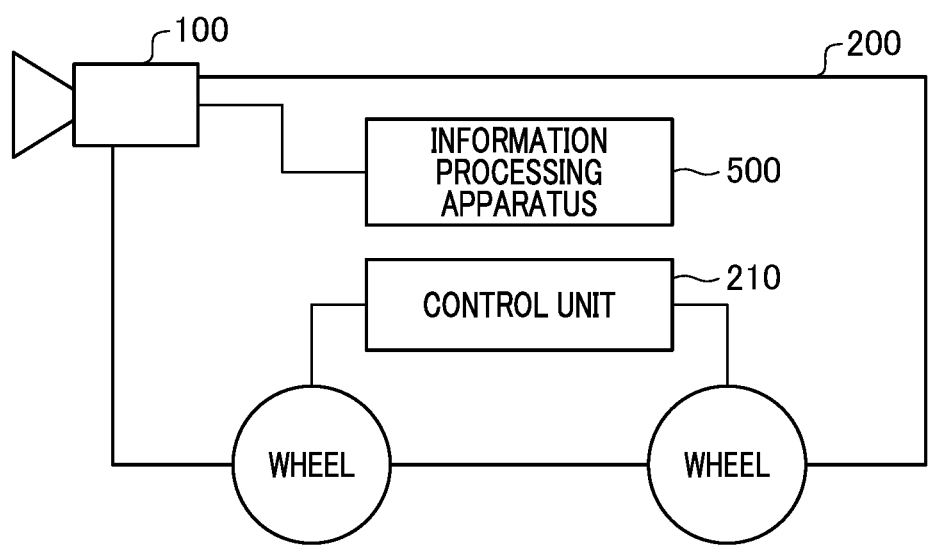
FIG. 2 is a diagram showing the configuration of a mobile robot according to the first embodiment.

FIG. 2 is a diagram showing the configuration of a mobile robot according to the first embodiment, and 200 denotes a mobile robot, 100 denotes a three-dimensional sensor that acquires shape information, 210 denotes a control unit that drives and controls the wheels of the mobile robot 200, and 500 denotes an information processing apparatus in the first embodiment.

Note that the information processing apparatus 500 incorporates a CPU as a computer, and functions as a control unit that controls the operation of each part of the entire mobile robot 200 based on a computer program stored in a memory serving as a storage medium. Further, the control unit 210 controls the movement or rotation (steering) of the moving body (movable device, moving device, movable apparatus, moving apparatus, mobility, vehicle) based on the shape map that was formed by the information processing apparatus 500.

Figure 3:
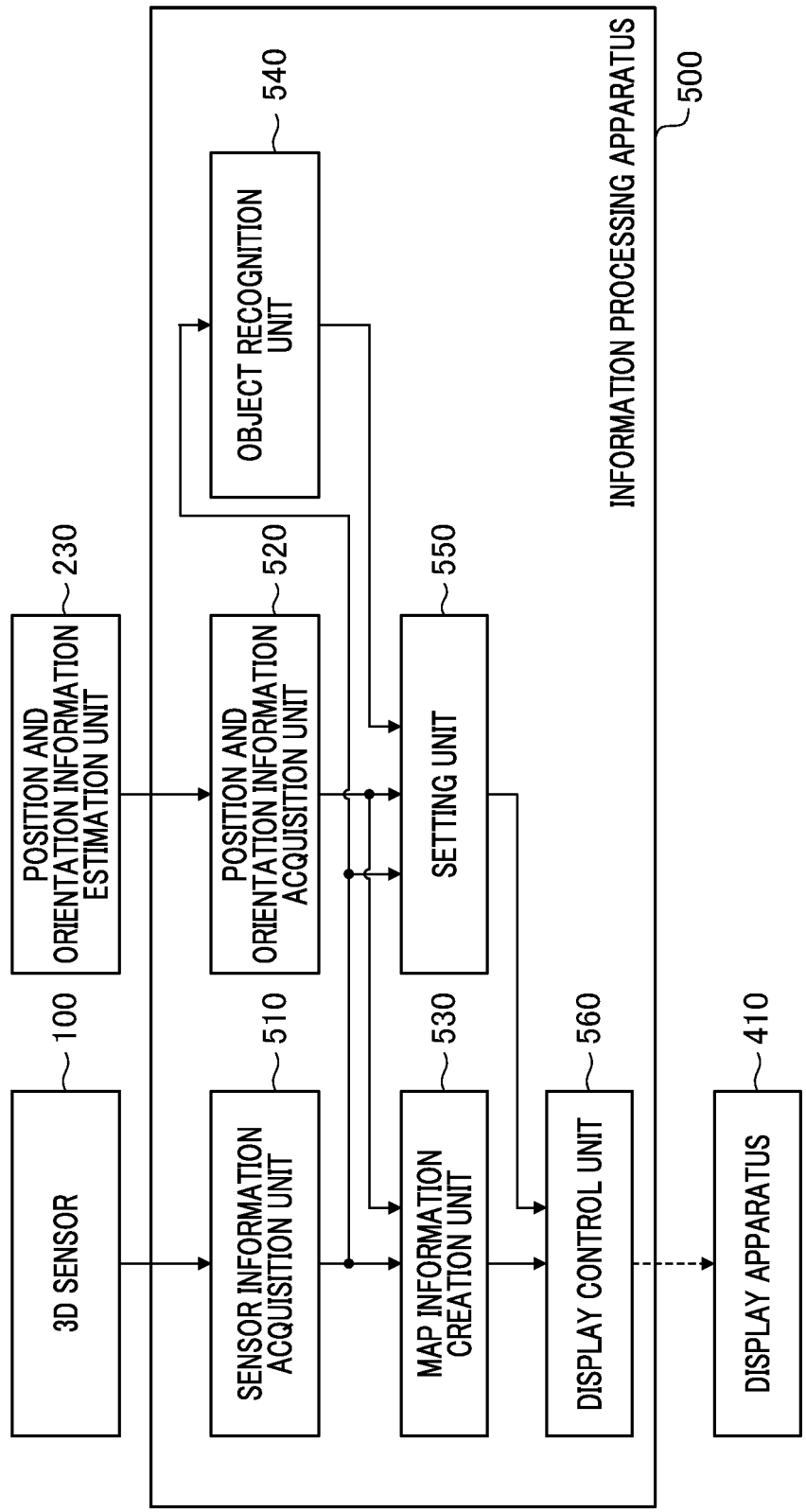
FIG. 3 is a functional block diagram showing a configuration of modules inside and associated with an information processing apparatus 500 according to the first embodiment.

FIG. 3 is a functional block diagram showing a configuration of modules inside and associated with an information processing apparatus 500 according to the first embodiment. Note that some of the functional blocks shown in FIG. 3 are implemented by causing a computer (not shown) that is included in the information processing apparatus 500 to execute a computer program stored in a memory serving as a storage medium (not shown).

However, these may be partially or entirely implemented with hardware. A dedicated circuit (ASIC), a processor (reconfigurable processor, DSP), or the like can be used as hardware.

Further, each of the functional blocks shown in FIG. 3 need not be incorporated in the same housing, and may be configured with separate devices that are connected to each other via a signal path. Note that the above-described explanation relating to FIG. 3 applies similarly with respect to FIG. 11. In FIG. 3, 510 denotes a sensor information acquisition unit, 520 denotes a position and orientation information acquisition unit, 530 denotes a map information creation unit, 540 denotes an object recognition unit, 550 denotes a setting unit, and 560 denotes a display control unit.

The three-dimensional sensor (3D sensor) 100 is a sensor that acquires shape information of an object. In the first embodiment, the three-dimensional sensor is a depth sensor that captures a distance image of an object that is configured by, for example, a stereo camera or the like.

The mobile robot 200 is, for example, a robot that moves on a horizontal plane, and drives a motor or the like based on a control signal from the control unit 210, and performs movement and rotation (steering) within the horizontal plane. Note that the position and orientation of the mobile robot 200 and the relative position and orientation of the three-dimensional sensor 100 are set so as to have a predetermined relationship in advance. Accordingly, the position and orientation of the three-dimensional sensor 100 provided in the mobile robot can be calculated based on a control signal from the control unit 210.

The display apparatus 410 is a monitor that outputs an image. The sensor information acquisition unit 510 acquires sensor information that includes shape information from the three-dimensional sensor 100 that is mounted on a moving body (movable device, moving device, movable apparatus, moving apparatus, mobility, vehicle). The position and orientation information acquisition unit 520 acquires the position and orientation information of the three-dimensional sensor from a position and orientation information estimation unit 230 when the three-dimensional sensor 100 measured the shape information.

The position and orientation information estimation unit 230 is for estimating the position and orientation of the three-dimensional sensor 100, and estimates the position and orientation of the three-dimensional sensor 100 based on, for example, a control signal for drive control of a moving body (movable device, moving device, movable apparatus, moving apparatus, mobility, vehicle) or a gyro sensor and the like. The map information creation unit 530 creates a shape map of the surroundings based on the shape information that was acquired by the sensor information acquisition unit 510 and the position and orientation information that was acquired by the position and orientation information acquisition unit 520.

The object recognition unit 540 recognizes a portion corresponding to a movable object. In the shape information that was acquired by the three-dimensional sensor 100. The setting unit 550 sets a measurement omission region that corresponds to a measurement omission in the shape map based on sensor information that includes shape information that was acquired by the sensor information acquisition unit 510, position and orientation information that was acquired by the position and orientation information acquisition unit 520, and the portion that was recognized by the object recognition unit 540.

The display control unit 560 generates display information that distinguishes between the map that was created by the map information creation unit 530 and the measurement omission region that was set by the setting unit 550.

Figure 4:
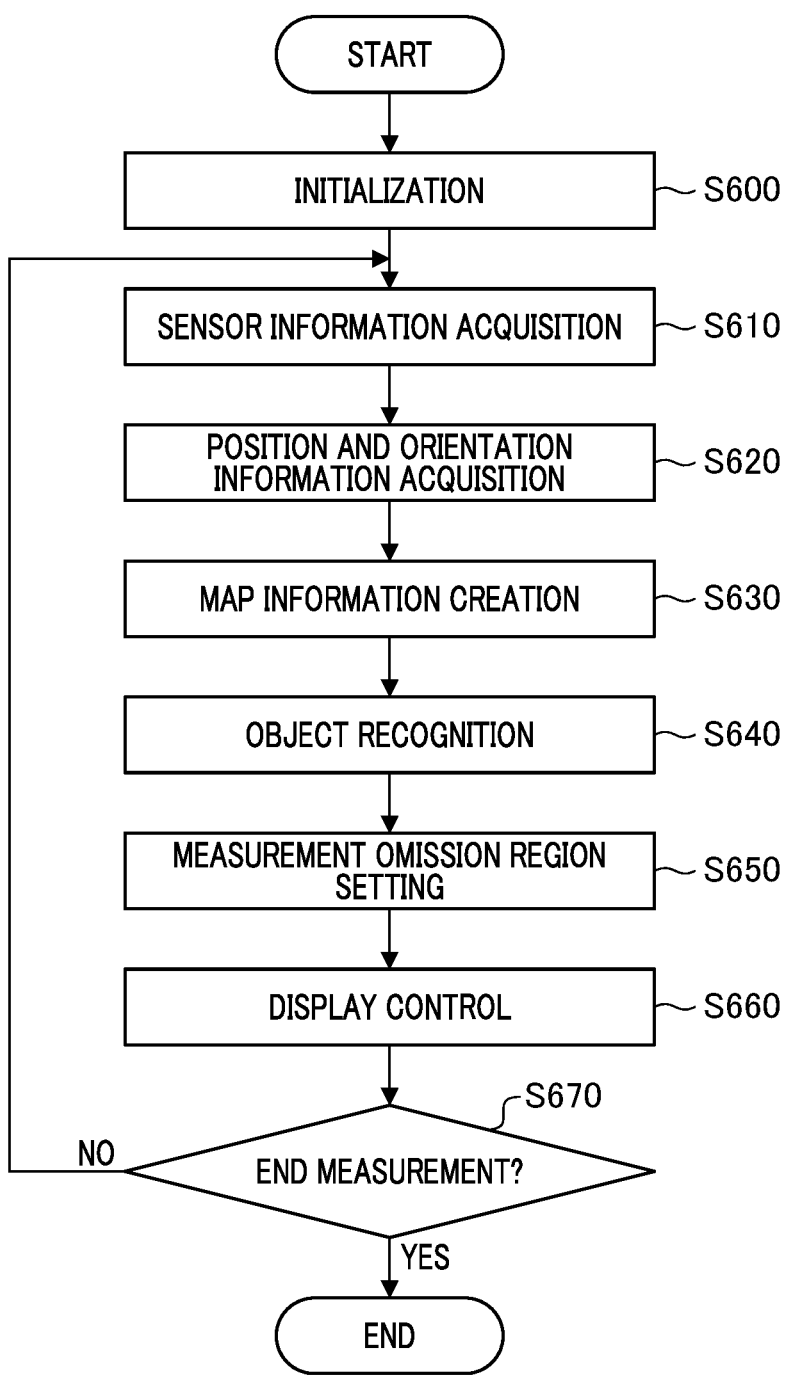
FIG. 4 is a flowchart showing a processing procedure according to the first embodiment.

Next, specific processing steps of the first embodiment will be explained. FIG. 4 is a flowchart showing a processing procedure according to the first embodiment. Note that each step of the flowchart of FIG. 4 is performed by a computer in the information processing apparatus 500 executing a computer program stored in a memory. Further, the flow of FIG. 4 is started, for example, by turning on the power of the mobile robot 200 and setting it to the map creation mode.

In step S600, the information processing apparatus 500 performs initialization for performing image acquisition and calculation. Specifically, processing such as loading a parameter that was necessary for starting and processing a program or a sensor from a storage unit (not shown) included in the information processor 500 is performed.

In step S610 (sensor information acquisition step), the information processing apparatus 500 acquires sensor information (shape information) from the three-dimensional sensor 100 by the sensor information acquisition unit 510. Specifically, a distance image is acquired. At each time point i, the distance image that was acquired is denoted by $D_i$ (i=0 to t).

Here, i=0 denotes the time at which the initialization was performed, and t denotes the current time. Further, the three-dimensional coordinates indicated by each pixel j that are included in $D_i$ are denoted by $R_{ij}$. Note that $R_{ij}$ is a three-dimensional coordinate with the three-dimensional sensor 100 serving as an origin.

In step S620 (position and orientation information acquisition step), the information processing apparatus 500 acquires position and orientation information of the three-dimensional sensor 100 from the position and orientation information estimation unit 230 by the position and orientation information acquisition unit 520. In the first embodiment, the position and orientation of the three-dimensional sensor 100 is calculated based on the control signal of the control unit 210.

The position and orientation that was acquired at each time point i is denoted by $P_i$. Note that the control unit 210 is a module that controls the wheels of the mobile robot 200 based on a control signal that includes a movement amount and a (horizontal) rotation amount of the mobile robot 200.

In the position and orientation information estimation unit 230, the position and orientation $Q_i$ of the mobile robot 200 is estimated based on the information of the amount of movement and the amount of rotation of the mobile robot 200. In addition, based on the relative position and orientation of the mobile robot 200 that has been calibrated and calculated in advance and the three-dimensional sensor 100, $Q_i$ undergoes coordinate transformation, and the position and orientation $P_i$ of the three-dimensional sensor is estimated.

Here, the position and orientation $P_i$ includes a three-dimensional position parameter and a three-dimensional orientation parameter, and is represented by a coordinate system O that is centered on the position of the mobile robot 200 at the time of initialization. Further, the XY plane of the coordinate system O is defined as the plane of the map to be output, and the X and Y coordinates of the coordinate system O represent the two-dimensional coordinates of the map. For example, the X and Y coordinate components of the position and orientation $P_i$ represent two-dimensional coordinates on the map. The two-dimensional coordinates on the map of the position and orientation $P_i$ are denoted by $Q_i$.

In step S630 (map information creation step), the information processing apparatus 500 creates a shape map of the environment based on the shape information that was acquired by the sensor information acquisition unit 510 and the position and orientation that was acquired by the position and orientation information acquisition unit 520 by using the map information creation unit 530.

Figure 5:
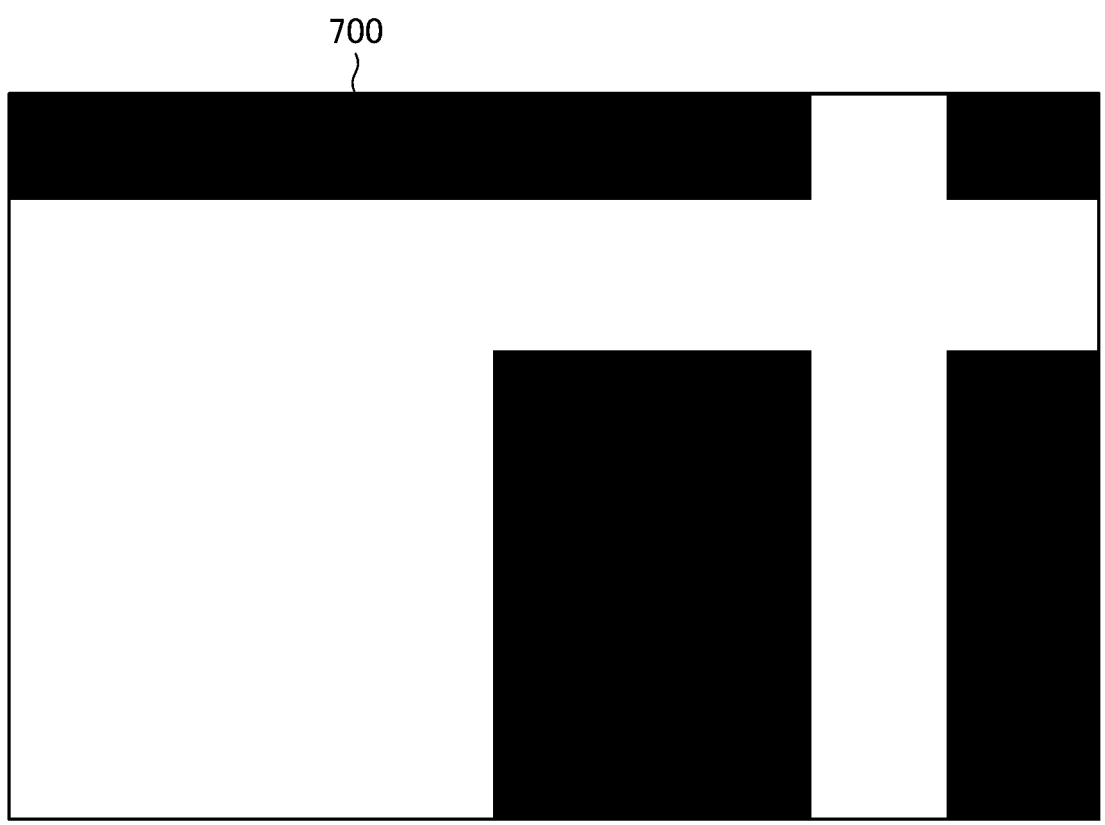
FIG. 5 is a diagram showing an example of a map according to the first embodiment.

FIG. 5 is a diagram showing an example of a map according to the first embodiment and in the first embodiment, the map information is a two-dimensional map, such as that shown as 700 in FIG. 5, which is a top view of a room in which the mobile robot moves.

In map 700, a black area denotes an occupied area in which an object is present, and a white area denotes an unoccupied area in which no object is present. Here, occupied and unoccupied can be determined by the distance image $D_i$. Specifically, based on the three-dimensional coordinate $R_{ij}$ of each pixel j that is included in the distance image $D_i$, it can be determined that the area from the center of the three-dimensional sensor 100 to that coordinate is a non-occupied area with no object, and the area behind that coordinate is an occupied area with an object.

To reflect this determination result on the map, first, by using the position and orientation $P_i$ that was acquired at each time point i, the three-dimensional coordinate $R_{ij}$ of each pixel j that is included in the distance image $D_i$ is projected onto the map. The two-dimensional coordinate projected on the map is denoted by $S_{ij}$. Then, the region from the two-dimensional coordinate $Q_i$ to $S_{ij}$ of the three-dimensional sensor on the map can be determined as an unoccupied region in which there is no object, and the region beyond $S_{ij}$ can be determined as an occupied region in which there is an object.

This is calculated for all distance images $D_i$ (i=0 to t) to perform determination of occupied and non-occupied regions of the entire range that was measured by moving/rotating the mobile robot 200. By representing these occupied and unoccupied regions in the two colors of black and white, a map 700 can be created, as shown in FIG. 5.

The map 700, which denotes such occupancy/non-occupancy, is referred to as an "occupancy map". A method for creating an occupancy map is well known and an occupancy map may be created by using, for example, the method described in the above Publication 1.

In step S640 (object recognition step), the information processing apparatus 500 recognizes, by the object recognition unit 540, a portion corresponding to a movable object among the shape information that was acquired by the three-dimensional sensor 100. In the first embodiment, a movable object is defined as, for example, a person, which is recognized based on the distance image that was acquired by the sensor information acquisition unit 510. For example, a machine learning-based method can be used as a method to recognize a person from a distance image. In the present embodiment, it is not necessary to go as far as recognizing who a person is, and if a movable object that is a person can be detected from the image, the role of the object recognition unit can be fulfilled.

Specifically, a program can be prepared to recognize similar regions for a given distance image $D_i$ by learning the regions in which people are present in various distance images of people serving as input. A method for recognizing a person based on machine learning is well known, and may be, for example, the method described in the above Publication 2. Note that the three-dimensional coordinate of the pixel that is included in the portion that was recognized on the distance image is denoted by $T_{ik}$. k denotes the number of pixels.

In step S650 (setting step), in the information processing apparatus 500, the setting unit 550 sets a measurement omission region based on the shape information that was acquired by the sensor information acquisition unit 510, the position and orientation measurement that was acquired by the position and orientation information acquisition unit 520, and the portion that was recognized by the object recognition unit 540.

Figure 6:
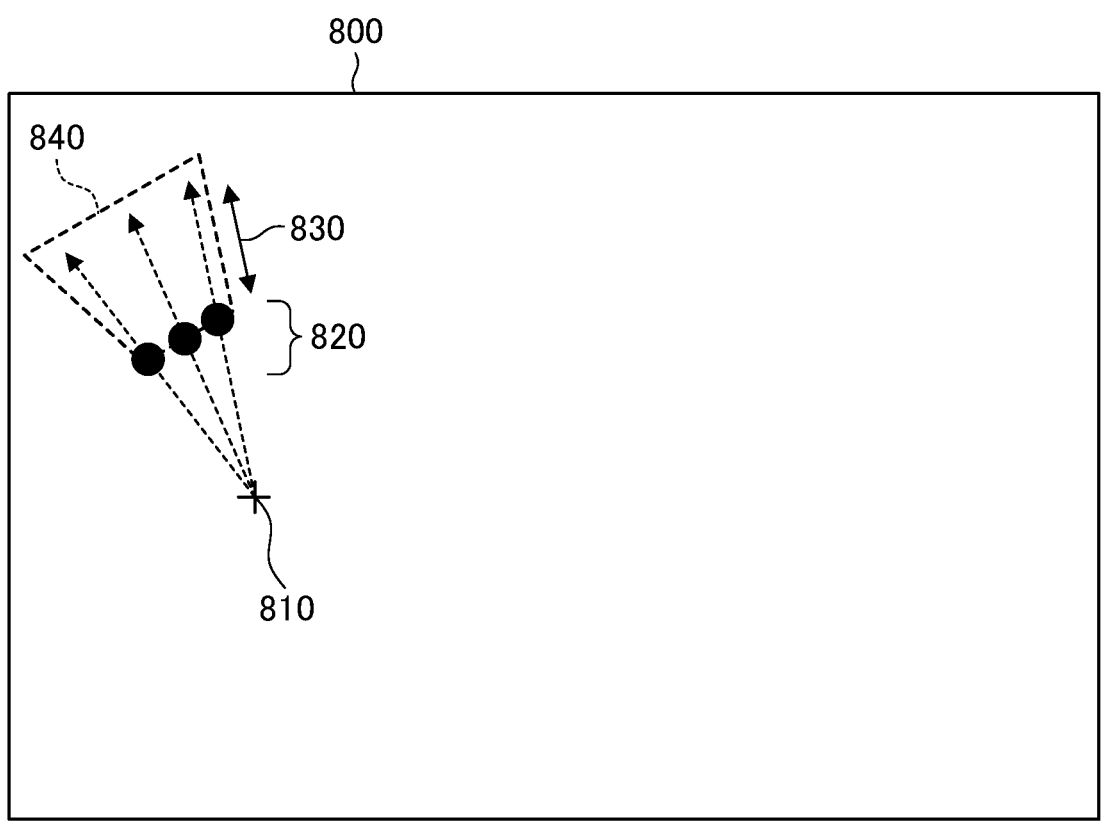
FIG. 6 is a diagram showing a positional relationship between a three-dimensional sensor and a movable object according to the first embodiment.

Specifically, first, in a case in which a movable object is recognized by the object recognition section 540 at time i, the three-dimensional coordinate Tik that is included in the recognized portion is projected onto the map. The projected two-dimensional coordinate is referred to as "Uik". FIG. 6 is a diagram showing a positional relationship between a three-dimensional sensor and a movable object according to the first embodiment.

Here, as shown in FIG. 6, on a straight line from the three-dimensional sensor position Qi (810) towards Uik (the point group of 820), the region at the back of Uik is denoted as the measurement omission region. That is, based on the position and orientation of the three-dimensional sensor, a region at the back of the direction toward the recognized portion, which is behind the portion when viewed from the three dimensional sensor, is set as the measurement omission region.

In the first embodiment, a line segment in a range of a predetermined length L from the position of Uik on a straight line is set as Vik (830), and a region (840) in a predetermined range M from the line segment Vik (830) is set as a measurement omission region. Note that the region that is set at each time i is denoted by Ai. The region Ai is stored in a storage unit (not shown).

In step S660, the information processing apparatus 500 generates display information in which the map that was created by the map information creation unit 530 and the measurement omission region information that indicates the measurement omission that was set by the setting unit 550 are distinguished by the display control unit 560, and displayed by a display apparatus.

Figure 7:
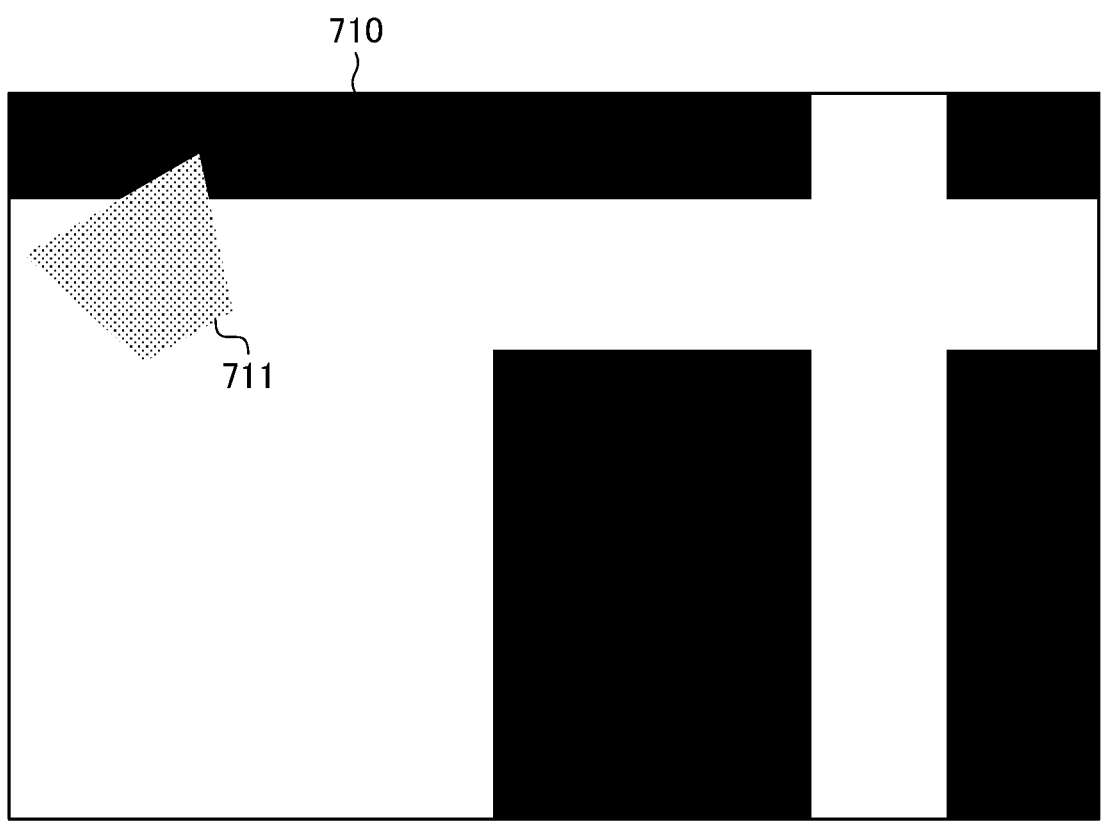
FIG. 7 is a diagram showing an example of displaying a measurement omission region on a map according to the first embodiment.

FIG. 7 is a diagram showing an example of displaying a measurement omission region on a map according to the first embodiment. In the first embodiment, as shown in FIG. 7, the pattern of the measurement omission region is changed and displayed for an occupied region or an unoccupied region on the map.

Here, 710 denotes a map and 711 denotes a measurement omission region. Further, the information to be displayed is displayed on the display apparatus 410 on the controller 400 operated by the user 300 via a communication unit (not shown).

Note that the user 300 confirms the information displayed here, and in a case in which a measurement omission is found, after performing a process such as deleting the movable object from the map, performs re-measurement by moving/rotating the mobile robot 200 so that the three-dimensional sensor 100 can measure the measurement omission region. Thereby, a high-quality map with no measurement omission can be created.

In step S670, the information processing apparatus 500 repeats the processing of steps S610 to S660 until the user instructs the end of the measurement. In each iteration, the sensor information acquisition unit 510 acquires sensor information at the new time and performs processing.

As described above, in the first embodiment, a measurement omission region due to a movable object can be displayed on a map. By viewing this display and controlling the position and orientation of the three-dimensional sensor so as to compensate for a measurement omission, the user can create a high-quality map with no measurement omission.

Note that in the first embodiment, the three-dimensional sensor 100 is a depth sensor that acquires a distance image. However, the three-dimensional sensor may be any sensor that acquires object shape information. As disclosed above, a stereo camera may be used to create a distance image by stereo matching, or Light Detection and Ranging (LiDAR) or the like that use lasers to acquire shape information may also be used.

Alternatively, an image capturing element such as a CMOS image sensor having DAF functionality may be used. Note that "DAF" is an abbreviation of "Dual pixel Auto Focus".

Further, in addition to the three-dimensional sensor 100, the sensor information acquisition unit 510 may acquire a plurality of sensor information. For example, it may acquire by adding sensor information of a two-dimensional camera that acquires images, or a gyro sensor, a magnetic sensor that recognizes a position of magnetic tape attached to the floor, or the like. The plurality of sensor information acquired here may be used by the position and orientation information acquisition unit 520 and the object recognition unit 540, as will be described in detail below.

Further, in the first embodiment, the position and orientation information acquisition unit 520 acquires the position and orientation that was estimated by the position and orientation information estimation unit 230. In the first embodiment, the position and orientation information estimation unit 230 estimates the position and orientation of the three-dimensional sensor 100 based on the control signal for driving the mobile robot 200 as a moving body (movable device, moving device, movable apparatus, moving apparatus, mobility, vehicle). However, the position and orientation acquired by the position and orientation information acquisition unit 520 may acquire the position and orientation that was estimated by any method.

For example, the position and orientation information estimation unit 230 may estimate the position and orientation of a three-dimensional sensor based on the distance image that was acquired from the three-dimensional sensor by the sensor information acquisition unit 510. For example, using the distance image Di at each time i as input, by calculating the relative position and orientation between the images by ICP and calculating the cumulative value of the relative position and orientation, the position and orientation of the three-dimensional sensor at each time i can also be estimated and acquired. Note that "ICP" is an abbreviation of "Iterative Closed Point".

A method for estimating the position and orientation of a sensor based on a distance image is well known, and for example, the method disclosed in the above Publication 3 may be used. Further, in a case in which the sensor information acquisition unit 510 additionally acquires sensor information such as a two-dimensional camera, a gyro sensor, a magnetic sensor, or the like, this sensor information may be further used to estimate position and orientation. That is, at least one of a camera, gyro sensor, a magnetic sensor, or the like that captures a two-dimensional image may be used to perform position and orientation information estimation.

Further, in the first embodiment, the map information creation unit 530 projects the three-dimensional coordinate included in the distance image that was acquired by the sensor information acquisition unit 510 onto a two-dimensional coordinate on the map to create a two-dimensional map. However, the map created by the map information creation unit 530 may be a three-dimensional map. That is, the shape map created by the map information creation unit 530 may be a three-dimensional or two-dimensional shape map.

Similarly, in the case of a three-dimensional map, a map can be created by determining occupancy/non-occupancy in a space. A method of creating a three-dimensional map may use the method of the above-described Publication 3. Note that in that case, a map showing an occupied region or an unoccupied region may be used, or a map in which a boundary between an occupied and an unoccupied region is represented by a line may be used.

Further, the map information creation unit 530 may create a map by using the three-dimensional coordinate in which the three-dimensional coordinate Tik corresponding to the portion of the movable object that was recognized by the object recognition unit 540 has been removed. By removing a portion of a movable object, the map that can be created may be configured only by static objects. A method of removing a movable object from a map may use the method of the above-described Publication 1.

Further, in the first embodiment, the object recognition unit 540 recognized a portion corresponding to a movable object among the shape information that was acquired by the three-dimensional sensor 100. Specifically, among the sensor information that was acquired by the sensor information acquisition unit 510, a movable object was recognized based on the shape information that was acquired from the three-dimensional sensor.

However, the object recognition unit 540 may use any method capable of recognizing a movable object. The sensor information acquisition unit 510 may acquire two-dimensional image data from a camera that captures the two-dimensional image information, and may recognize a portion of a movable object based on the acquired two-dimensional image data.

Further, in the first embodiment, although set to recognize a person as a movable object, a movable object may be, for example, a small animal or the like other than a person. Alternatively, other mobile robots may be assumed, and it can be assumed that transported items with a high probability of being moved are temporarily placed.

For any object, by inputting various distance images or two-dimensional images in which the assumed movable object appears, and by learning a portion in which the movable object is present, a similar portion can also be recognized with respect to a given distance image Di.

Further, in the first embodiment, the three-dimensional coordinate Tik included in the portion recognized by the object recognition unit 540 is projected onto the map (Uik, 810 of FIG. 6), and the region to the rear (back) thereof was set as the measurement omission region that indicates a measurement omission.

However, with respect to the measurement omission region, the portion itself that was recognized by the object recognition unit 540, which is the source thereof, may be set as the measurement omission region. That is, as shown by 721 of FIG. 8, Uik itself projected on a map may be set.

Figure 8:
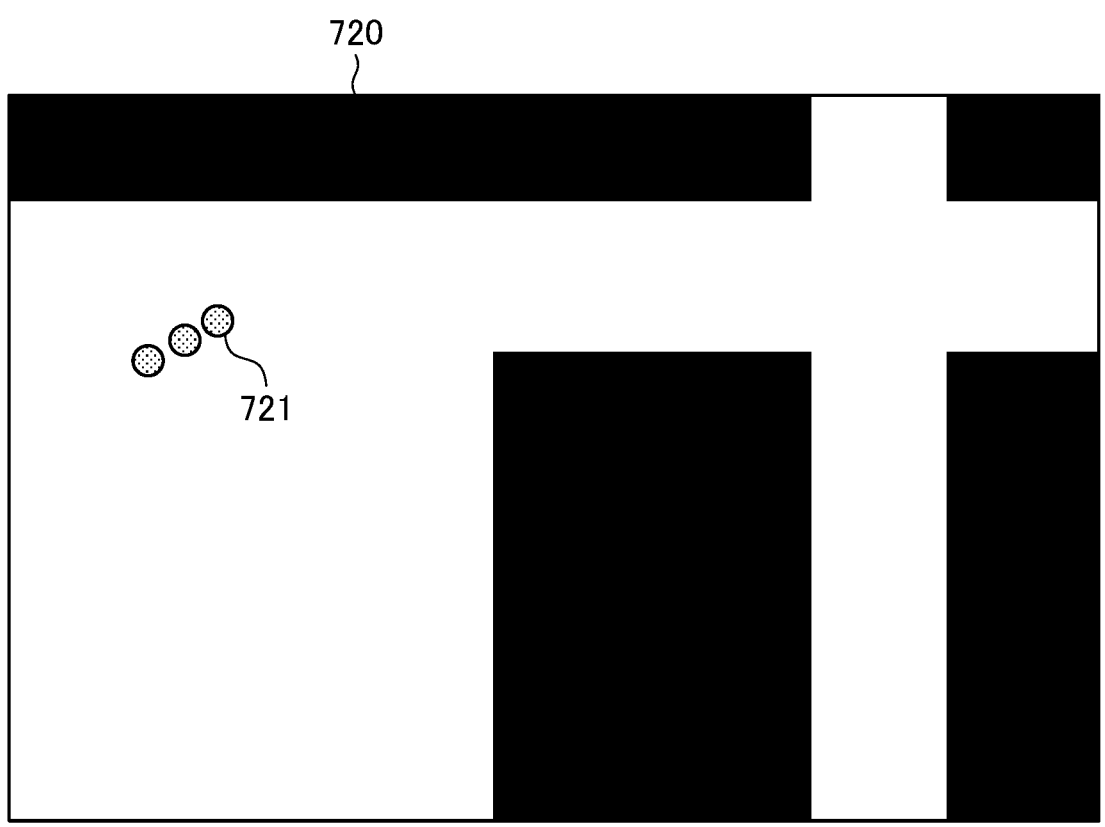
FIG. 8 is a diagram showing another example of displaying a measurement omission region on a map according to the first embodiment.

FIG. 8 is a diagram showing another example of displaying a measurement omission region on a map according to the first embodiment. Although 721 does not directly indicate a measurement omission region, the user 300 can see this and indirectly know that there is a measurement omission region in the back thereof.

Further, in the first embodiment, the display control unit 560 was made to display by distinguishing between an occupied region or an unoccupied region on the map and a measurement omission region by changing the pattern of the measurement omission region. However, in the display control unit 560, any method is acceptable as long as a display signal for displaying by distinguishing between the shape map, which consists of an occupied region or an unoccupied region or the like on the map, and a measurement omission region, which indicates a measurement omission, is generated.

An occupied region and an unoccupied region on the map and the measurement omission region may be displayed in different colors, or the measurement omission region may be displayed so as to be distinguishable by making it flash.

Further, the information that is displayed may also display additional information that is separate from an occupied region or an unoccupied region, or from a measurement omission region. For example, the position and orientation of the mobile robot 200 at the current time may be displayed on the map.

By displaying information of the mobile robot 200 on the map, the position and orientation relationship of the region showing the measurement omission region and the mobile robot 200 can be easily confirmed, and it becomes easier for the user to understand how to move/rotate the mobile robot 200 so as to be able to measure the measurement omission region.

Second Embodiment

In the first embodiment, by recognizing a movable object, a measurement omission region is displayed, and the measurement omission region shows that this region could not be measured at the time when the movable object was recognized. That is, if this region can be measured at another time, there is the possibility that the measurement omission region will be eliminated.

Specifically, there is a case in which the user 300 can eliminate the measurement omission region by performing re-measurement by moving/rotating the mobile robot 200 so that the measurement omission region displayed on the display apparatus 410 will later have the three-dimensional sensor 100 facing that region.

In this manner, it is desirable that the region that could be re-measured be removed from the map displayed on the display apparatus 410 because thereafter it is not necessary to display it as a measurement omission region.

In the second embodiment, in the setting unit 550, similar to the first embodiment, first, the measurement omission region is calculated in a case in which a movable object was recognized. Here, the time at which the movable object was recognized is denoted by x, and the set measurement omission region is denoted by Ax.

Then, in a case in which this area Ax could be measured at any of all other times (0 to t, but excluding x), this area Ax is determined as having been measured. Then, the setting unit 550 sets the measurement omission region, excluding the area determined as having been measured.

Specifically, at all times (0 to t; however, excluding x), in a condition in which a movable object is not recognized, a search is made as to whether the area that was measured by the three-dimensional sensor 100 has a part that overlaps with the measurement omission region Ax. In addition, in a case in which there is an overlapping part, that overlapping part is determined as already measured information of the setting of the setting unit 550, and only the remaining region is set as the measurement omission region.

Figure 9:
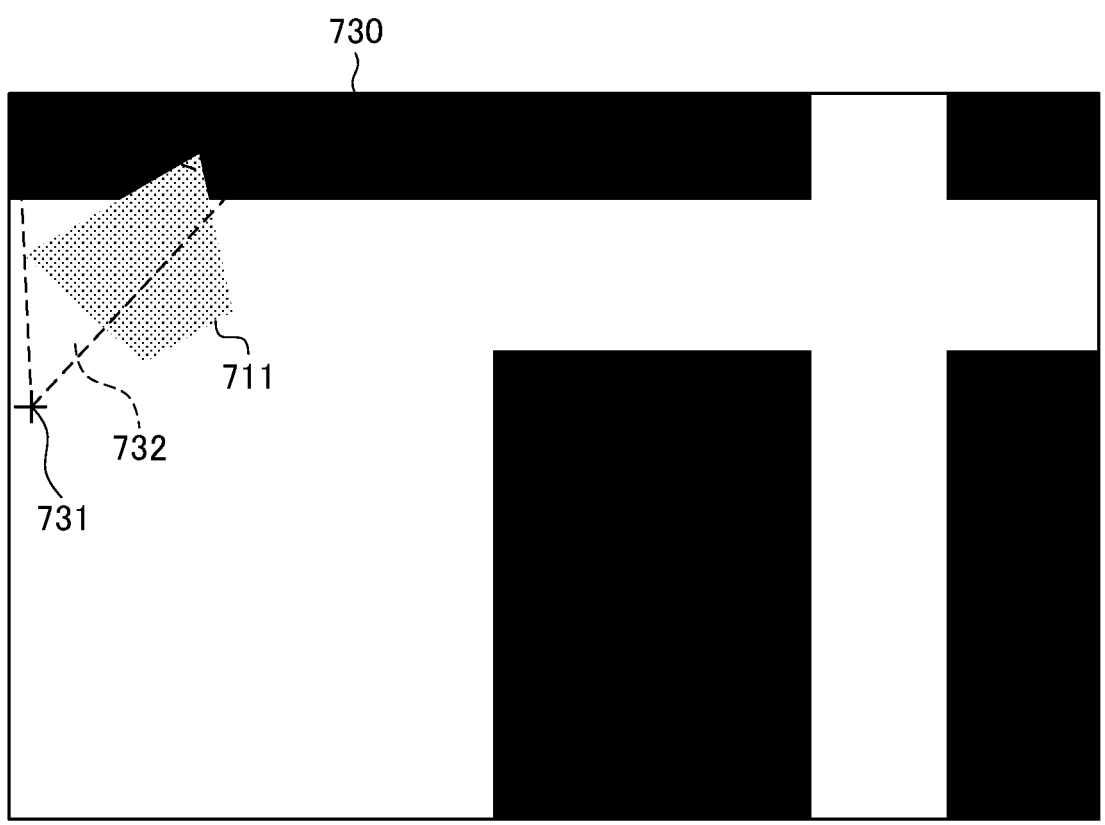
FIG. 9 is a diagram showing an example of re-measuring a measurement omission region according to a second embodiment.

FIG. 9 is a diagram showing an example of re-measuring a measurement omission region according to a second embodiment, and 730 is an example of a map that has re-measured the measurement omission region at a time u. 731 denotes the position of the three-dimensional sensor 100 at time u, and 732 denotes the re-measurement region that the three-dimensional sensor 100 has re-measured.

As in FIG. 9, in a case in which the re-measurement region 732 and the measurement omission region 711 overlap, the overlapping region is determined as having been measured. In addition, the map information creation unit 530 determines occupancy and non-occupancy based on the shape information of the time u, and expresses this as black and white information.

Figure 10:
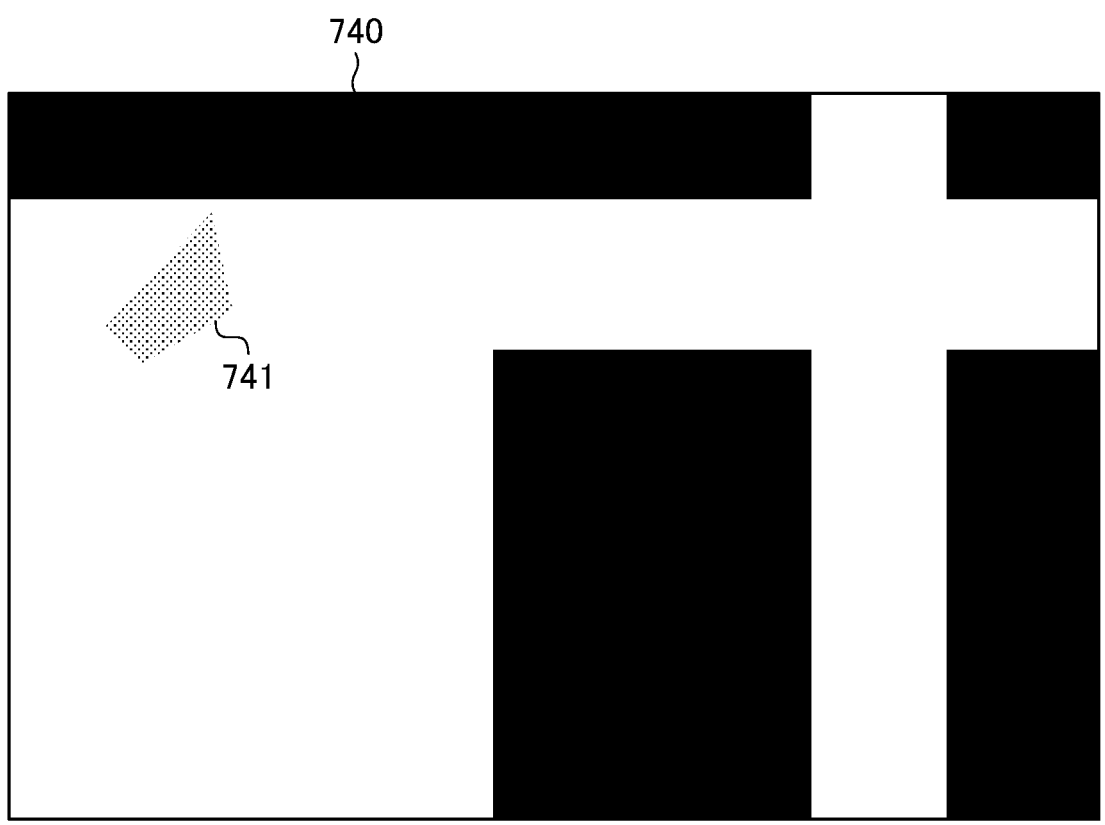
FIG. 10 is a diagram showing an example in which the remeasured part of the measurement omission region has been deleted according to the second embodiment.

FIG. 10 is a diagram showing an example in which the remeasured part of the measurement omission region according to the second embodiment has been deleted, and it shows an example of non-display of the overlapping region in FIG. 9. In 740 in FIG. 10, the region of 741 shows the remaining measurement omission region that has not yet been re-measured.

As described above, in the second embodiment, in a case in which a measurement omission region can be re-measured at another time, it is determined as having been measured and is deleted from the map or is not displayed. That is, the region that was measured by the three-dimensional sensor at a time different from the time when the object recognition unit 540 recognized the object is excluded from the measurement omission region.

In this manner, the user can confirm as to whether or not the measurement omission region has been re-measured, thereby preventing them from forgetting to re-measure. In this manner, a high-quality map with no measurement omissions can be created.

As described above, in the second embodiment, in a case in which the measurement range of the three-dimensional sensor 100 has a part overlapping with the area Ai, this overlapping part is deleted from the setting of the setting unit 550, and is made to not be displayed on the map. However, the display of the measurement omission region set on the map may be removed based on the input of the user 300.

For example, the user 300 specifies a measurement omission region on the map by the controller 400 and performs display control so that this region is not displayed. By this operation, the user 300 can delete while checking whether the measurement omission regions have been re-measured one by one, and prevent the forgetting of re-measurement of the measurement omission region.

Third Embodiment

In first embodiment, the user 300 saw the displayed measurement omission region and controlled the movement and rotation of the mobile robot 200 so that the three-dimensional sensor 100 was able to measure that region. However, the control of the mobile robot 200 may perform automatic control, rather than manual control by the user 300.

Note that, in the present embodiment, because the user 300 no longer needs to manually control the mobile robot 200 to perform the re-measurement, there is no need to control the display of the measurement omission information to the user 300 by the display unit 560.

Figure 11:
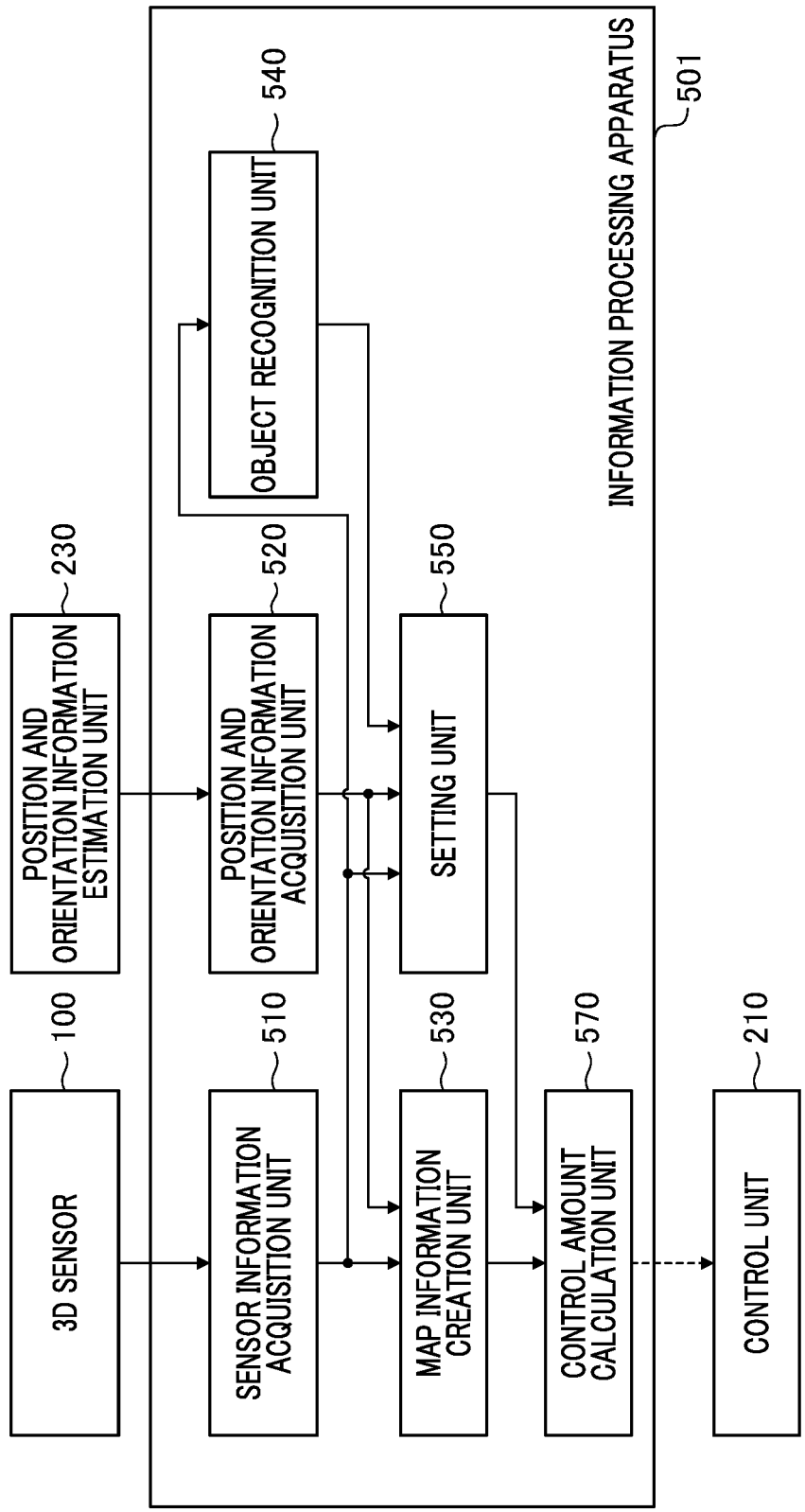
FIG. 11 is a functional block diagram showing a configuration of modules inside and associated with an information processing apparatus 501 according to a third embodiment.

FIG. 11 is a functional block diagram showing a configuration of modules inside and associated with an information processing apparatus 501 according to a third embodiment. In FIG. 11, the sensor information acquisition unit 510, the position and orientation information acquisition unit 520, the map information creation unit 530, the object recognition unit 540, and the configuration unit 550 have the same function as the functional modules of the same name in first embodiment.

Further, unlike the first embodiment, the display control unit 560 is not included and instead, a control amount calculation unit 570 is provided, and the output of the control amount calculation unit 570 controls the control unit 210.

Figure 12:
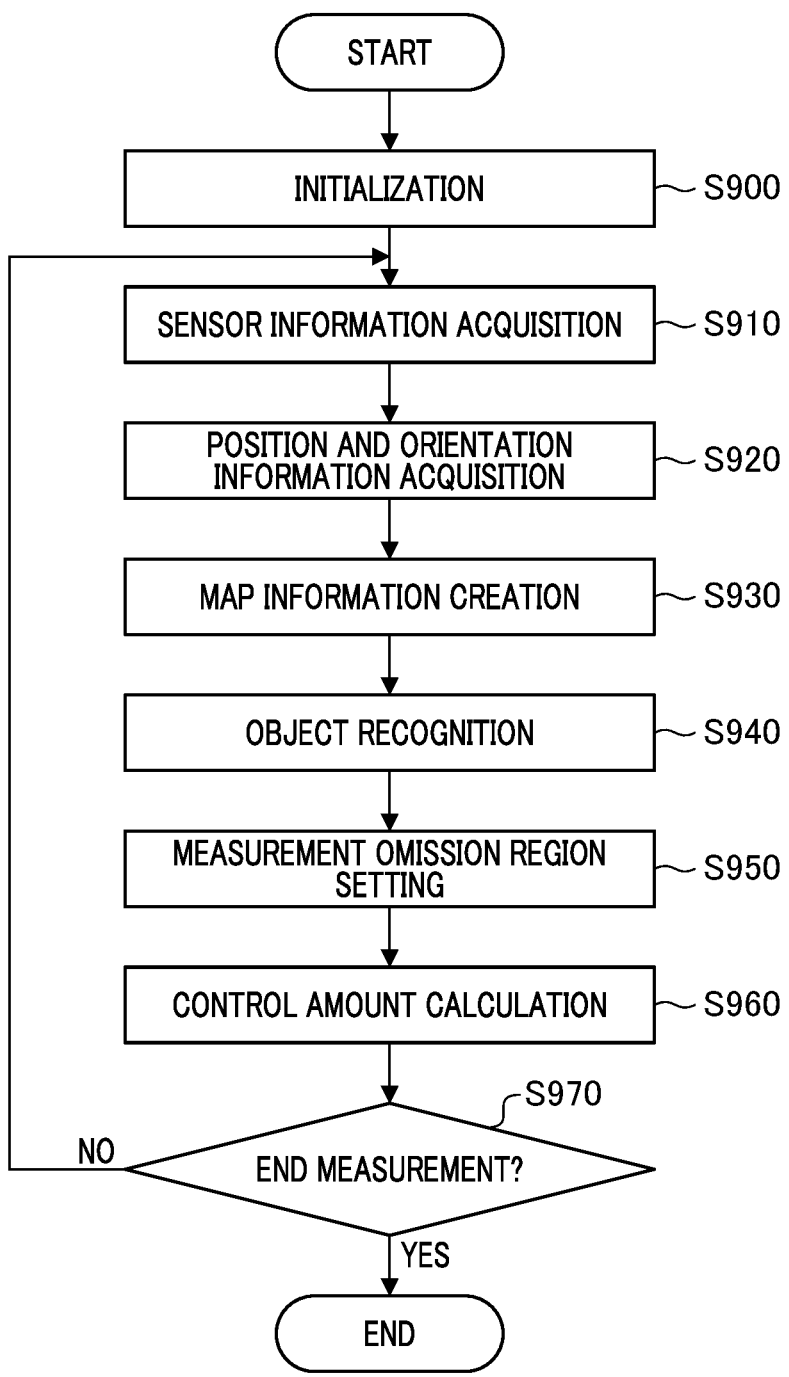
FIG. 12 is a flowchart showing a processing procedure according to the third embodiment.

FIG. 12 is a flowchart showing a processing procedure according to the third embodiment. The operation of each step of the flowchart of FIG. 12 is performed by a computer in the information processing apparatus 501 executing a computer program stored in a memory.

The processing in steps S900 to S950, and step S970 is the same as steps S600 to S650 and step S670 in the first embodiment, respectively, and thus a description thereof will be omitted. However, there is no processing of display control by the display control unit 560 in step S660 of the first embodiment, and instead, the control amount calculation processing of step S960 is performed.

Hereinafter, in step S960, the content of the processing that calculates the control amount by the control amount calculation unit 570 will be explained.

In step S960, the information processing apparatus 501 automatically calculates the amount of movement and rotation of the mobile robot 200 so that the three-dimensional sensor 100 can measure the measurement omission region by the control amount calculation unit 570. Specifically, first, the measurement omission region of the destination is automatically selected. In the third embodiment, the measurement omission region that is closest to the current position and orientation of the three-dimensional sensor 100 is selected.

The selected measurement omission region is denoted by As. Next, a virtual viewpoint for remeasurement is set in the vicinity of the selected region As. In the third embodiment, in a region within a predetermined range N from the measurement omission region As, at the location that is unoccupied on the map (that is, a location in which there is no object), and the viewpoint that is closest to the current position and orientation of the three-dimensional sensor is set. Note that this viewpoint sets the direction of the measurement omission region As.

Next, a movement amount and a (horizontal) rotation amount of the mobile robot 200 is calculated so that the difference between the current position and orientation of the three-dimensional sensor that is acquired by the position and orientation information acquisition unit 520 and the set viewpoint is set to zero. In addition, by performing output of the calculated movement amount and rotation amount to the control unit 210, the mobile robot 200 automatically moves/rotates toward the measurement omission region. Thereby, a measurement omission region can be re-measured.

As described above, in the third embodiment, the mobile robot is automatically controlled so that the measurement omission region can be re-measured, and the measurement omission region is re-measured. That is, based on the position and orientation information and the measurement omission region, the movement or rotation of the mobile robot is controlled to measure the measurement omission region by the three-dimensional sensor. Thereby, it is possible to create a high-quality map with no measurement omission while reducing user effort.

Note that, in the third embodiment, although the mobile robot 200 is automatically controlled based on the movement amount and rotation amount calculated by the control amount calculation unit 270, the calculated movement amount and rotation amount may be displayed on the display apparatus 410 so that the user 300 can input the control amount with reference thereto. In that case, a numerical value of the movement amount and rotation amount may be displayed on the display apparatus 410, or the control amount may be indicated by indicating the position and direction on a map.

The above first embodiment to third embodiment can also be implemented by executing the following processing. Specifically, it is a process in which software ("program") that implements the functions of the embodiments described above is supplied to a system or device via a network or various storage media, and a computer (or CPU, MPU, or the like) of the system or apparatus reads and executes a program. Further, the program may be recorded on a computer readable recording medium and provided.

In the first embodiment, a measurement omission region due to a movable object is displayed on a map. The user can move and rotate the three-dimensional sensor of the mobile robot to compensate for a measurement omission by looking at this display, thereby creating a high-quality map with no measurement omissions.

In the second embodiment, in a case in which a measurement omission region was able to be measured at another time, it is determined as having already been measured and is not displayed on the map. In this manner, the user can easily confirm whether or not the measurement omission region has been re-measured, thereby preventing them from forgetting to re-measure. In addition, a high-quality map with no measurement omissions can be created.

In the third embodiment, by automatically controlling the mobile robot so that a measurement omission region can be re-measured, a high-quality map with no measurement omission can be created, while reducing user effort.

In the above embodiments and the like, a three-dimensional sensor may be any sensor that acquires the shape information of an object. A depth sensor may be a depth sensor that acquires a distance image, a LiDAR that acquires shape information by using a laser, or a stereo camera that is capable of creating a distance image by stereo matching.

In addition to the three-dimensional sensor, the sensor information acquisition unit may acquire a plurality of sensor information. For example, it may be acquired by adding sensor information of a two-dimensional camera that acquires images, a gyro sensor, or a magnetic sensor that recognizes a position of magnetic tape attached to the floor, or the like.

The position and orientation information acquisition unit may acquire the estimated position and orientation by any method. The position and orientation may be estimated based on the control signal of the mobile robot, or it may be a position and orientation that was estimated based on sensor information acquired by the sensor information acquisition unit.

The map that is created by the map information creation unit may be any map that can represent the shape of the environment. It may be a two-dimensional map or a three-dimensional map. It may be a map showing an occupied region or an unoccupied region, or it may be a map with lines representing the boundaries thereof.

A recognition method in the object recognition unit can be any method capable of recognizing a movable object. A movable object may be recognized based on the shape information that was acquired from a three-dimensional sensor, or a movable object may be recognized based on two-dimensional image information.

The method of setting the measurement omission region indicating a measurement omission in the setting unit may be any method as long as it is possible to indicate a region that is behind the portion of the movable object that was recognized by the object recognition unit. A portion of the movable object that was recognized by the object recognition unit may be set, and a region behind this may be indirectly indicated.

Any method may be used as long as the display unit can display by distinguishing between the shape map and the measurement omission region. A pattern or color may be changed and displayed, and may be displayed with or without flashing.

Note that, in the embodiments described above, examples in which an image processing system was mounted on a mobile robot as a moving body, such as an AGV or an AMR, was explained. However, the moving body of the embodiments is not limited to a mobile robot, and may be a drone or any other mobile device that can be moved. Further, information processing systems of the embodiments include those that are mounted on a moving body (movable device, moving device, movable apparatus, moving apparatus, mobility, vehicle) thereof.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the information processing apparatus through a network or various storage media. Then, a computer (or a CPU, an MPU, or the like) of the information processing apparatus may be configured to read and execute the program. In such a case, the program and the storage medium storing the program configure the present invention.

This application claims the benefit of Japanese Patent Application No. 2022-018484 filed on Feb. 9, 2022, which is hereby incorporated by reference herein in its entirety.

What is claimed is:

1. An information processing apparatus comprising:
at least one processor or circuit configured to function as a plurality of units comprising:
(1) a sensor information acquisition unit configured to acquire sensor information that includes shape information of a surrounding environment from a three-dimensional sensor mounted on a movable apparatus;
(2) a position and orientation information acquisition unit configured to acquire position and orientation information of the three-dimensional sensor when the three-dimensional sensor has measured the shape information;
(3) an object recognition unit configured to recognize a portion corresponding to a movable object in the shape information based on the sensor information;
(4) a setting unit configured to set, in a case where the portion is recognized, a region behind the portion within a predetermined range from the portion, as seen from the three-dimensional sensor, as a measurement omission region to be remeasured that corresponds to a measurement omission based on the sensor information, the position and orientation information, and the portion; and
(5) a map information creation unit configured to create a shape map of the surrounding environment based on the shape information, the position and orientation information, and information of the measurement omission region, wherein the measurement omission region is distinguishably displayed in the shape map.

2. The information processing apparatus according to claim 1, wherein the at least one processor or circuit is further configured to function as a display control unit configured to generate a display signal for displaying by distinguishing between the shape map and the measurement omission region.

3. The information processing apparatus according to claim 1, wherein the setting unit is configured to set the portion as the measurement omission region.

4. The information processing apparatus according to claim 1, wherein the setting unit is configured to exclude from the measurement omission region a region that was measured by the three-dimensional sensor at a time different from the time when the object recognition unit recognized the object.

5. The information processing apparatus according to claim 1, further comprising a camera configured to acquire two-dimensional image information,
wherein the object recognition unit is configured to recognize the portion of the movable object based on the two-dimensional image information.

6. The information processing apparatus according to claim 1, wherein the at least one processor or circuit is further configured to function as:
a control unit configured to control the movement or rotation of the movable apparatus to measure the measurement omission region by the three-dimensional sensor based on the position and orientation information and the measurement omission region.

7. The information processing apparatus according to claim 1, wherein the three-dimensional sensor includes (1) a stereo camera or (2) a LiDAR or (3) an image sensor, the image sensor having a DAF (Dual pixel Auto Focus) function.

8. The information processing apparatus according to claim 1, wherein the position and orientation information acquisition unit is configured to acquire the position and orientation information of the three-dimensional sensor based on a control signal for driving the movable apparatus.

9. The information processing apparatus according to claim 1, wherein the position and orientation information acquisition unit is configured to acquire the position and orientation information of the three-dimensional sensor based on a distance image that has been acquired from the three-dimensional sensor.

10. The information processing apparatus according to claim 1, wherein the position and orientation information acquisition unit is configured to acquire the position and orientation information by using at least one of (1) a camera for capturing a two-dimensional image, (2) a gyro sensor, and (3) a magnetic sensor.

11. The information processing apparatus according to claim 1, wherein the map information creation unit is configured to create a three-dimensional shape map or a two-dimensional shape map.

12. A movable apparatus comprising:
a three-dimensional sensor; and
at least one processor or circuit configured to function as a plurality of units comprising:
(1) a sensor information acquisition unit configured to acquire sensor information that includes shape information of a surrounding environment from a three-dimensional sensor mounted on a movable apparatus,
(2) a position and orientation acquisition unit configured to acquire position and orientation information of the three-dimensional sensor when the three-dimensional sensor has measured the shape information,
(3) an object recognition unit configured to recognize a portion corresponding to a movable object in the shape information based on the sensor information,
(4) a setting unit configured to set, in a case where the portion is recognized, a region behind the portion within a predetermined range from the portion, as seen from the three-dimensional sensor, as a measurement omission region to be remeasured that corresponds to a measurement omission based on the sensor information, the position and orientation information, and the portion,
(5) a map information creation unit configured to create a shape map of the surrounding environment based on the shape information, the position and orientation information, and information of the measurement omission region, wherein the measurement omission region is distinguishably displayed in the shape map, and
(6) a control unit configured to control the movement and rotation of a movable apparatus based on the shape map.

13. An information processing method comprising:
a sensor information acquisition step of acquiring sensor information that includes shape information of a surrounding environment from a three-dimensional sensor mounted on a movable apparatus;
a position and orientation information acquisition step of acquiring position and orientation information of the three-dimensional sensor when the three-dimensional sensor has measured the shape information;
an object recognition step of recognizing a portion corresponding to a movable object in the shape information based on the sensor information;
a setting step of setting, in a case where the portion is recognized, a region behind the portion within a predetermined range from the portion, as seen from the three-dimensional sensor, as a measurement omission region to be remeasured that corresponds to a measurement omission based on the sensor information, the position and orientation information, and the portion; and
a map information creating step of creating a shape map of the surrounding environment based on the shape information, the position and orientation information, and information of the measurement omission region, wherein the measurement omission region is distinguishably displayed in the shape map.

14. A non-transitory computer-readable storage medium configured to store a computer program comprising instructions for executing a method, the method comprising:
a sensor information acquisition step of acquiring sensor information that includes shape information of a surrounding environment from a three-dimensional sensor mounted on a movable apparatus;
a position and orientation information acquisition step of acquiring position and orientation information of the three-dimensional sensor when the three-dimensional sensor has measured the shape information;
an object recognition step of recognizing a portion among the shape information that corresponds to a movable object based on the sensor information;
a setting step of setting, in a case where the portion is recognized, a region behind the portion within a predetermined range from the portion, as seen from the three-dimensional sensor, as a measurement omission region to be remeasured that corresponds to a measurement omission based on the sensor information, the position and orientation information, and the portion; and a map information creating step of creating a shape map of the surrounding environment based on the shape information, the position and orientation information, and information of the measurement omission region, wherein the measurement omission region is distinguishably displayed in the shape map.

* * * * *